United States Patent

[11] 3,603,026

[72] Inventor Takaya Kishigami
Tokyo, Japan
[21] Appl. No. 20,526
[22] Filed Mar. 18, 1970
[45] Patented Sept. 7, 1971
[73] Assignee Gakken Co., Ltd.
Tokyo, Japan

[54] FABRICATING TOYS
10 Claims, 16 Drawing Figs.

[52] U.S. Cl. .......... 46/26
[51] Int. Cl. .......... A63h 33/10
[50] Field of Search .......... 46/16, .7, 24, 25, 26, 27, 31

[56] References Cited

UNITED STATES PATENTS 879,455 2/1908 Frost .......... 46/25
1,150,363 8/1915 Haskins .......... 46/29
2,052,600 9/1956 Boss .......... 46/16 X
2,861,388 11/1958 Fauaretto .......... 46/16

*Primary Examiner*—Louis G. Mancene
*Assistant Examiner*—D. L. Weinhold
*Attorney*—Irving M. Weiner

ABSTRACT: A fabricating component has several first holes, and a second hole orthogonal to and between the first holes. One end of the first hole has an enlarged indentation, and the other end of the hole has a projection shaped like the indentation so that the projections of one component can be interlocked with the indentations of another component. Several fabricating components can be connected by components which have the shape of a rod, a tube, a U-shaped member, or an elongated grooved member having a series of projections.

INVENTOR

TAKAYA KISHIGAMI

BY

ATTORNEY

INVENTOR
TAKAYA KISHIGAMI

BY Irving M. Weiner
ATTORNEY

FABRICATING TOYS

The present invention relates to a fabricating device, and more particularly, relates to fabricating components and their accessory elements, viz, hereinafter referred to as the connecting components.

The inventive device can be employed in the construction industry, as a children's fabricating toy, as well as in other applications. The invention is especially adapted for assembling play in which children build up a structure from the various fabricating components.

SUMMARY

The present invention provides a fabricating device which comprises, in combination, a fabricating component, and a connecting component. The fabricating component includes at least two substantially parallel major surfaces and includes at least one first perforation having its longitudinal axis disposed substantially transverse to the major surfaces. The fabricating component also includes at least one second perforation having its longitudinal axis disposed substantially parallel to the major surfaces. One of the major surfaces has a projection which surrounds one end of the first perforation. The other one of the major surfaces has an indentation which surrounds the other end of the first perforation. The cross section of the projection is substantially similar to the cross section of the indentation. The connecting component is adapted to interconnect at least two of the fabricating components by fitting at least partially within the first perforation or the second perforation.

In one possible embodiment of the invention, the fabricating component has systematically perforated vertical and horizontal through holes in which connecting components, such as connecting rods, may be inserted. This embodiment may be used, for example, as a fabricating toy, wherein many fabricating components may be connected together either vertically or horizontally by inserting the connecting rods through the aforementioned holes of the fabricating components.

The connecting component, such as the mentioned connecting rod, combines or connects the various fabricating components. The rod may be inserted through the first or second, or vertical or horizontal, perforations or holes in the fabricating components. The rod is designed for a smooth or easy insertion and pulling out, for a close contact with the interior wall of the perforation or hole in its inserted position, and for a stable and firm combination of the fabricating components.

The invention also provides connecting components other than the aforementioned connecting rod. Such other connecting components permit several fabricating components to be connected together in a straight combination or in a coplanar arrangement. Such other connecting components do not obstructively expose themselves outside the largest dimensions of the fabricating component.

In addition, any of the inventive fabricating components, while being assembled, can immediately be used as a bearing element.

The novel fabricating components can be combined into an interlocked pileup arrangement even without the aforementioned connecting components.

In one embodiment, the present invention provides a fabricating toy which serves for a colorful variety of creative play activities resulting from the use of the various novel components.

The inventive fabricating component may be formed from thick plate material which is vertically perforated from the top to the bottom thereof. Each of the vertical or first perforations has an opening at the top or first major surface to the fabricating component with an interlocking projection. These first or vertical perforations may be made in the component at regular intervals.

The fabricating component may also be provided with regularly spaced horizontal or second perforations between the vertical or first perforations. These horizontal perforations may have the same diameter as the vertical ones.

The fabricating component may also be provided with a groove which runs around the periphery of the component, for example, on its four sides. Connecting components in the shape of rods may be provided in several different lengths to connect the fabricating components. Such rods are used for insertion in the vertical and horizontal perforations. These rodlike connecting components may be made of tubular material, and may have a discontinuous annular cross section or a cross section which has a groove which opens onto the periphery of the rod and is directed toward the center. Such a groove can include the entire length of the longitudinal axis of the rod. It is preferable for the rodlike connecting components to be made from a material which possesses deflective characteristics and elastic restitution.

When pressure is applied to the aperture of the discontinuous annular or circular shape of the rodlike connecting member, or in the direction in which the groove will close, then he diameter of the rodlike connecting member will decrease. Thus, the diameter of the rodlike connecting component will be decreased by applying pressure when it is to be inserted into a perforation of the fabricating component. When the connecting component has been inserted into the perforation and the pressure has been released, the diameter will expand to contact closely the interior wall of the perforation.

In another form of the connecting component according to the invention, the connecting component carries a plurality of projections at regular intervals which correspond to the intervals between the second or horizontal perforations of the fabricating components. These connecting components may be utilized for connecting several fabricating components which are disposed in a horizontal combination or in a coplanar arrangement.

In another embodiment of the connecting component, the connecting component has a clamp shape or a U shape which carries legs which are spaced apart by an interval which is equivalent to the interval between perforations of contiguous fabricating components.

A fabricating component can be stacked by inserting the interlocking projections into he interlocking indentations of another fabricating component. Several fabricating components can be similarly combined in tiers, in parallel both above and below, alternately, and further intersectionally. The fabricating components can be combined by the insertion of the interlocking projections into the mating indentations of other fabricating components without the necessity of the connecting components to complete the fabrication operation.

Furthermore, by penetrating the rodlike connecting component into the vertical or first perforation of the fabricating components, several fabricating components can be assembled in a manner entirely different from the techniques explained hereinabove. This different method enables and permits the fabrication while securing blank spaces between tiers of the fabricating components. By penetrating the rodlike connecting component into the horizontal or second perforation of the fabricating component, many fabricating components can be combined side by side in a row of the same level. Also, as an application of this method of fabrication, it is possible to arrange several fabricating components around the rodlike connecting component at any desired angle. This angle may be freely selected or set around the rodlike connecting component, for example, at 30°, 45°, 90°, or 0°. Thus, penetration of the rodlike connecting component into the vertical or horizontal perforations of the fabricating components enables the free assembling of the components vertically, horizontally, or radially at any desired angle.

In addition, there may be employed other embodiments of the connecting component, which differ from the aforementioned rodlike connecting component, that can freely rotate within the perforation of the fabricating component. In this manner, the fabricating component may be utilized as a bearing component for different types of rotating or evolving elements, such as wheels and the like.

A plurality of the fabricating components can be connected together by the mutual insertion of the projections of connecting components and the horizontal perforations of the fabricating components when arranged at the same level in such a way that their front and rear sides stand face to face. Similar connections can be attained by the insertion of the legs of the U-shaped connecting components into he nearby horizontal perforations of contiguous fabricating components. These types of connecting components do not obstructively expose themselves because they lie on the groove which is engraved on the sides of the fabricating components.

DETAILED DESCRIPTION OF SOME PREFERRED EMBODIMENTS

Figure 1A:
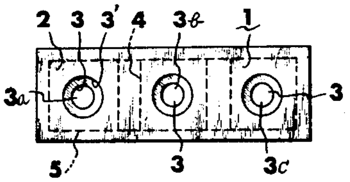
FIG. 1A illustrates a top plan view of a first embodiment of the fabricating component according to the present invention.
Figure 1B:
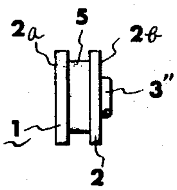
FIG. 1B shows an end view of the first embodiment illustrated in FIG. 1A.
Figure 1C:
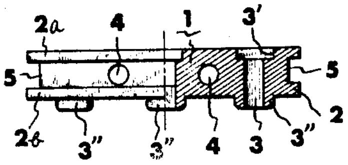
FIG. 1C illustrates a side elevational view, partly in cross section, of the embodiment shown in FIG. 1A.

FIGS 1A, 1B and 1C illustrate a first embodiment of the fabricating component 1 according to the invention. A main portion 2 of the fabricating component 1 may be a thick plate, formed from various materials, such as plastics. The main portion 2 may have a different variety of shapes or forms, such as a square shape, an oblong shape, a rectangular shape, etc. In these particular embodiments illustrated in the drawings, the length, size, and square measurement of the various fabricating components may vary, but the thickness is always the same.

A plurality of first or vertical perforations 3 extend down from the top surface of the main portion 2 to the bottom surface of the main portion 2. The number of perforations 3 may be determined in accordance with the length and size of the main portion 2. The intervals between the perforations 3 may be regularly established with the same distance.

The main portion 2 may have the shape of an oblong, with the perforations 3 aligned with he same intervals therebetween. The interval between the centers of perforations 3*a* and 3*b* is equal to the interval between the centers of perforations 3*b* and 3*c*. The distance from the perforation 3*a* or 3*c* to the sides of the fabricating component is equivalent to one-half of the interval between the center of the perforations 3*a* and 3*b* or perforations 3*b* and 3*c*.

The structure of the first or vertical perforation 3 is clearly illustrated in FIG. 3C. At the top opening of the perforation 3, there is formed an enlarged interlocking dent or indentation 3′. At the bottom opening of the perforation 3, there is formed an interlocking projection 3″ which encircles the circumference of the perforation. The projection 3″ is shaped to fit into the interlocking indentations 3′. The length of the projection 3″ is identical with the depth of the interlocking indentation 3′, and the shape of the projection corresponds with that of the indentation 3′ and also with those interlocking indentations which may be formed on other fabricating components for vertical insertion. In FIGS. 1A, 1B and 1C, the interlocking indentation 3′ is cylindrical or round in shape, and the interlocking projection 3″ has a corresponding tubular shape.

In the main portion 2 there are also provided second or horizontal perforations 4 which run from one side of the fabricating component to the other side and are disposed between the first or vertical perforations 3*a* and 3*b*, or 3*b* and 3*c*. The horizontal perforations 4 do not intersect or contact the vertical perforations 3, but rather are disposed at right angles to the vertical perforations 3. The horizontal perforations 4 are bored regularly maintaining the same intervals therebetween as the intervals between adjacent vertical perforations 3. In the illustrated first embodiment, the fabricating component 1 has three vertical perforations 3 spaced at equal intervals, and two horizontal perforations 4 disposed orthogonally between the vertical perforations 3.

Figure 3F:
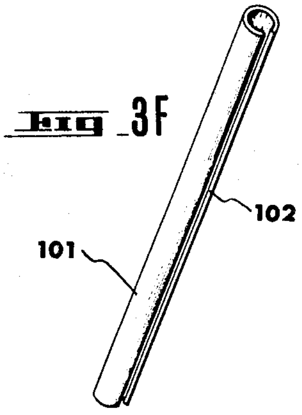
FIG. 3F shows a prospective view of one type of rodlike connecting component according to to the present invention

The diameter of the vertical perforations 3 may be made equal to the diameter of the horizontal perforations 4 in order that a mutual connecting component, such as the connecting rod 101 shown in FIG. 3F, can be inserted in either the horizontal perforations 4 or the vertical perforations 3.

The fabricating component 1 may be provided with a groove 5 which surrounds or encircles the main portion 2 at the center of the side. As shown in FIGS. 1B and 1C, the width of the groove 5 may be made a little larger than the diameter of the perforations 3 and 4, so that the main portion 2 will have projecting top and bottom edges in the form of flanges 2*a* and 2*b*.

Figure 2D:
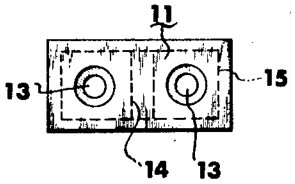
FIG. 2D shows a top plan view of a second embodiment of the fabricating component according to the present invention.

With reference to FIG. 2D, there is illustrated a top plan view of a second embodiment of a fabricating component 11 which has a length that is shorter than the fabricating component 1. The length of the fabricating component 11 is equal to two-thirds of the length of the fabricating component 1. In the various fabricating components according to the invention, the number of horizontal perforations may be made at least one less than the number of the vertical perforations. Accordingly, in the fabricating component 11, the number of vertical perforations 13 will be two, and between the vertical perforations 13 there will be disposed one horizontal perforation 14. The fabricating component 11 is also provided with a surrounding or encircling groove 15.

Figure 2E:
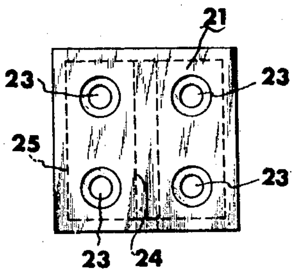
FIG. 2E illustrates a top plan view of a third embodiment of the fabricating component according to the present invention.

FIG. 2E illustrates a plan view of a square-shaped fabricating component 21 which covers a total square area equivalent to placing two of the fabricating components 11 next to each other in parallel. There are four vertical perforations 23 which are disposed at uniform intervals. It should be noted that only a single horizontal perforation 24 is bored between the four vertical perforations 23. The fabricating component 21 is surrounded by a groove 25.

As may be noticed from the foregoing, the number of the first or vertical perforations will be determined in accordance with the length of the fabricating component, and the number of the vertical perforations will range from two to N. Also, the number of the horizontal perforations will be determined in accordance with the length of the fabricating component. The diameter of these perforations may all be made identical, and the intervals between the perforations may also be made common to all fabricating components.

Figure 6:
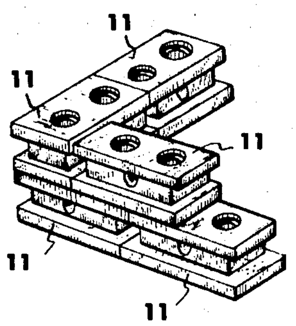
FIG. 6 illustrates a perspective view of several of the fabricating components of FIG. 2B which have been combined by themselves without the use of any accessory connecting component.

The aforementioned fabricating components may all be connected together, for example, as ordinary fabricating toys, without the need for adapting attachments such as connecting components. That is, the fabricating components may be mutually assembled by insertion of the interlocking projections 3'' with the interlocking indentations 3' of another component. Such insertion of the interlocking projection 3'' and the indentation 3' may be completed by tiering numbers of such fabricating components together. These tiers can be made in parallel, alternately, in steps, or in directions crossing each other. An example of such assembly is shown in FIG. 6 which illustrates a perspective view of assembling a plurality of fabricating components 11, as shown in FIG. 2D, without the use of accessory connecting components.

Figures 3G, 3H, 3I, 4:
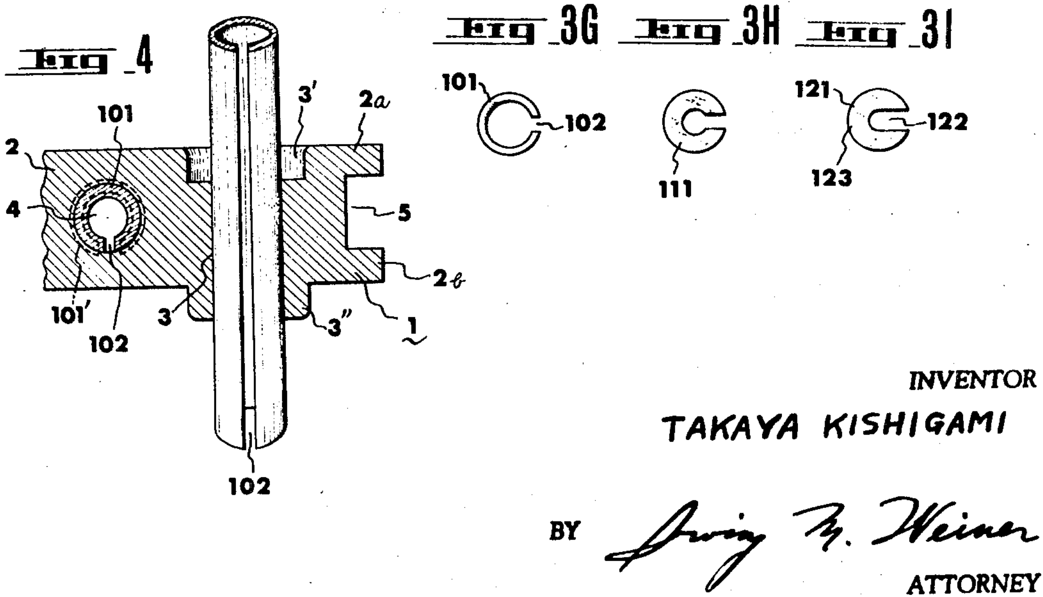
FIG. 3G shows a cross section of the tubular connecting component illustrated in FIG. 3F.
FIG. 3H shows a modification of the cross section of the connecting component shown in FIG. 3G.
FIG. 3I illustrates a further modification of the cross section shown in FIG. 3G wherein this modification contemplates a groove in a rodlike connecting component.
FIG. 4 illustrates an elevational view partly in cross section of the connecting component of FIG. 3F which has been inserted into the perforation of the fabricating component of FIG. 1A.

FIGS. 3F, 3G, 3H and 3I illustrate connecting components in the form of rods which can be used for combining the various fabricating components. These connecting components may be formed from solid, hollow, or tubular rod materials. The connecting component shown in FIG. 3F is a formed tube and its cross section is a discontinuous annulus or circle as shown in FIG. 3G. An aperture of gap 102 extends parallel to the entire length of the longitudinal axis of the connecting component 101. The width of the aperture 102 has a predetermined dimension.

A preferred material for forming the connecting component 101 may be metals or plastics, such as polyvinylchloride. These materials must be formed to maintain elasticity which will permit the connecting component 101 to decrease its diameter when pressure is applied from its outer girth towards its center in a way to close the aperture, and to restore its diameter to its normal condition when such pressure has been released. Accordingly, the material selected for the connecting component 101 must be elastic with a flexible characteristic and a force of restitution. When a metal material is used to form the connecting component 101, the thickness must be relatively small so that the aperture 102 will close easily when pressure is applied to decrease the outer diameter. This especially must be taken into consideration when the device is to be used as a plaything for children. It must be made to fully and easily flex to meet the holding and gripping abilities of children.

FIG. 3H illustrates another embodiment of the rodlike connecting component in which a thick-walled tubular material is employed. This connecting component 111 may be formed from plastics in order to secure a suitable flexibility.

FIG. 3I demonstrates another type of connecting component 121 formed from a plastic rod material. The connecting component 121 is provided with a deep groove 122 extending from a point on its outer girth to the center or longitudinal axis of the connecting component 121. This groove 122 extends the full length of and along the longitudinal axis of the connecting component 121, and functions similar to the aperture 102 of the aforementioned connecting component 101. This groove 122, which is deep enough to reach the center of the component, will close easily when pressure is applied from the outer periphery or girth of the component 121. The uncut portion 123 behind the groove 122 is made relatively thin so that the connecting component 121 will flex easily.

The rodlike connecting components 101, 111 and 121 may equally be employed to penetrate through the vertical and horizontal perforations of the aforementioned fabricating components. FIG. 4 illustrates in cross section the situation when the rodlike connecting components 101 have been inserted through a vertical perforation 3 and a horizontal perforation 4 of the fabricating component 1.

Normally, the diameters of the connecting components 101, 111 or 121 are slightly larger than that of the horizontal or vertical perforations of the fabricating components. To insert the rodlike connecting component 101 into the perforations, the aperture 102 should be closed by applying pressure from the outer periphery or girth. This decreases the outside diameter of the component 101 and thus enables a smooth insertion into the perforation 3 or 4.

After the component 101 has been inserted, the pressure will be released and the restitutive elasticity functions to expand the connecting component 101 allowing its outer girth to closely and elastically contact the interior wall of the perforation. FIG. 4 clearly shows in phantom lines indicated by the reference numeral 101' the outer periphery before the component is inserted, and also shows the component 101 in intimate contact with the interior wall of the perforation due to its power of restitution.

To extract or withdraw the component 101, pressure must be applied to the outer girth or periphery just as in the case of insertion. When the aperture 102 has been closed and the external diameter has been decreased, the connecting component 101 can be freely drawn out.

The foregoing explanation has been made referring to the connecting component 101, but it is equally applicable to he connecting components 111 and 121. Any desired structure can be assembled by inserting these connecting components into the perforation of the fabricating components to thereby connect together a plurality of such fabricating components.

The fabricating component 1 is provided with vertical and horizontal perforations 3 and 4, through which the connecting components 101 may be penetrated. As described before, pressure should be applied to the outer girth or periphery of the component 101 to decrease the outer diameter for insertion, and after which the pressure should be released. This combines the fabricating component with the connecting component. By penetrating connecting components 101 into the two-way directed perforations 3 and 4 in the fabricating component 1, the connecting components 101 are thereby fixed to the fabricating component 1 both vertically and horizontally. In addition, to the same connecting component 101 other fabricating components may be attached through the perforations which have been bored in them. Thus, a plurality of fabricating components can be assembled either vertically parallel or horizontally in line.

Furthermore, a fabricating component 1 with a connecting component 101 inserted in its vertical perforation 3 can be connected with another by inserting that same connecting component 101 into a horizontal perforation 4 of the other fabricating component. Moreover, a block of assembled fabricating components can be connected with other fabricating components around a single connecting component 101 at certain angles in the shapes of "V" or "L," i.e., at any desired angular relationship.

Figure 5:
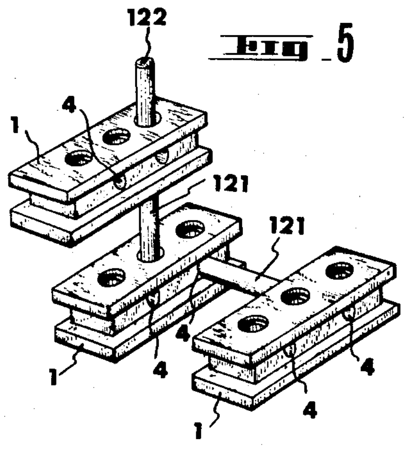
FIG. 5 depicts a perspective view of several fabricating components as shown in FIG. 1A which has been combined by use of the connecting component shown in FIG. 3I.

Another feature which should be mentioned about a combination of the fabricating components by the connecting component in the form of a rod is that this method enables a combination of a plurality of fabricating components individually with any desired spaces between the fabricating components. According to which method, a number of fabricating components can be attached to the connecting component either horizontally or vertically while retaining a desired space between adjacent fabricating components. One example of such a combination is illustrated in FIG. 5. In FIG. 5, three fabricating components 1 are connected with the rodlike connecting components 101 with spaced between the fabricating components 1. It is also possible to make the connections without leaving such spaces. When a plurality of the fabricating components, especially of the same size and type, are lined up, with corresponding sides in contact with each other and with connecting components threaded through the horizontal perforations of the fabricating components, then the group of connected fabricating components have a large surface square measurement which constitutes a basic portion of the structure.

When a rodlike connecting component is affixed to a fabricating component and a rotating element, such as a wheel, having a hole with a diameter which is larger than that of the connecting component, and this rotating element is slipped on to the connecting component, and then attached to another fabricating component, then the connecting component functions as a stable axle for the rotating element. Accordingly, any of the fabricating components may operate as a bearing element. This method of combination of plural fabricating components with a rodlike connecting component can, of course, be employed jointly with another type of combination, such as a direct mutual insertion of the tiered fabricating components as desired.

Figure 7J:
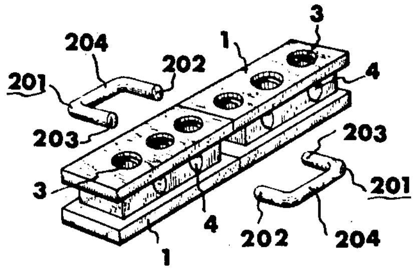
FIG. 7J illustrates a perspective view of two fabricating components in a position for combination by use of a U-shaped connecting component.
Figure 7K:
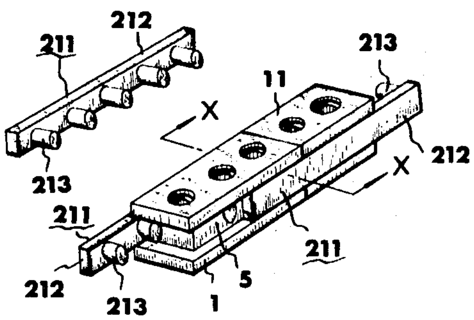
FIG. 7K illustrates a perspective view of two different fabricating components combined together by use of another form of connecting component.
Figure 7L:
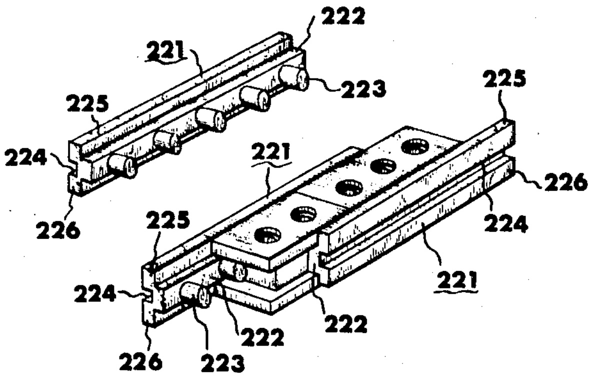
FIG. 7L illustrates a perspective view of two different fabricating components combined together by a further modification of the connecting component.

FIG. 7J, 7K and 7L illustrate other structure for joining the fabricating components which is especially usable in a horizontal combination of a plurality of fabricating components by special connecting components.

FIG. 7J depicts an example of a combination of a plurality of fabricating components 1 by the use of a clamp-shaped or U-shaped connecting component 201. This connecting component 201 may be made of plastic or metal and have legs 202 and 203 which may be inserted into the horizontal perforations 4 of the fabricating components 1. The legs 202 and 203 may be made at any desired length which is equivalent to the full depth of the horizontal perforation 4, or to one-half of the depth or to less than one-half of the depth.

The distance between the legs 202 and 203 should be the same as the interval between the perforations 4 of contiguous fabricating components 1 when they are arranged in a coplanar fashion.

To employ the connecting component 201, first insert a leg 202 into a horizontal perforation of the fabricating component, and then insert the other leg 203 into a perforation of contiguous fabricating component. Thus, the fabricating components are connected in a straight arrangement with the sides in contact with each other.

It is essential to note the base portion 204 of the connecting component 201 will be buried in the groove 5 in the side of the fabricating component 1. In other words, the connecting component 201 will not obstructively expose itself outside the external dimensions of the fabricating component.

The connecting component 211 in the FIG. 7K has a flat elongated base portion 212 which may be fitted and buried in the groove of the fabricating components to be connected together. The base portion 212 is provided with a plurality of projections 213. The length of the projections 213 may be made at any desired length. FIG. 7K shows that type of connecting 211 which may be inserted in both sides of the fabricating components 1 and 11.

The projections 213 in the FIG. 7K has a round cross-sectional shape which may be fitted into the horizontal perforations. The interval between the projections 213 should be set at a distance which is equal to the interval between the horizontal perforations in the aforementioned fabricating components.

Figure 8:
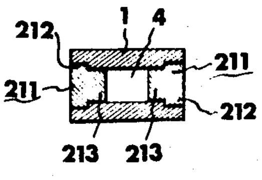
FIG. 8 shows a cross-sectional view taken along the line X—X of FIG. 7K.

To employ the connecting components 211, the connecting component 211 is inserted so that its projections 213 penetrate into the horizontal perforations 4 and 14 of the fabricating components 1 and 11 which are arranged in line and in a contiguous fashion. As shown in FIG. 7K, the connecting components 211 may be inserted in both sides of the fabricating components 1 and 11. At the joined or contiguous sides of the thus connected fabricating components 1 and 11, there will be formed a square hollow formed by the two joined grooves 5 and 15. This square hollow portion may best be seen in FIG. 8. This square hollow functions in a similar manner as the horizontal perforation. In other words, a projection 213 of the connecting component 211 may be fitted into this square hollow portion also.

When the base portion 212 is buried in he grooves 5 and 15, the bask surface of the connecting component 211 does not obstructively expose itself outside the flanges *2a* and *2b*.

It is also possible to join several fabricating components using only a single connecting component 211. However, if the length of the projection 213 is very short, it is best to use connecting components 211 on both sides of the fabricating components for a stabilized connection.

With reference to FIG. 7L, the connecting component 221 is provided with a plurality of projections 223 at uniform intervals on a surface of the base portion 222. On the surface of the base portion 222 which has no projections, the connecting component 221 is provided with a groove 224 and flanges 225 and 226. This connecting component 221 may be used in a similar fashion as the connecting component 211 which is illustrated in FIG. 7K.

An example of how the components shown in FIG. 7L may be used follows. With the connecting components 221, a plurality of the fabricating components may be connected in a straight and longitudinal arrangement. This type of connection may be further extended and the components rotated 90° from that shown in FIG. 7L. A pair of such extended and connected fabricating components may be connected together by using a plurality of rodlike connecting components 101 which have been inserted into the vertical perforations 3. Thus, the rodlike connecting components 101 will serve as parallel rods to connect the overhead rails formed by the connecting components 221. This type of connecting component 221 may, of course, by employed only when it is specially needed.

In summary, the various components of the present invention enables: the direct connection of the fabricating components by themselves in tiers by the insertion of the interlocking projections and indentations; connection of the fabricating components by the use of the rodlike connecting components vertically, horizontally and parallel, or with any desired spaced or angles therebetween; and connection of the fabricating components with the use of other special connecting components so that the fabricating components may be aligned and contiguous within the same level or plane.

The novel components of the invention, mixed and combined, will be of great benefit for the free creation of structures as a plaything for children, or even for industrial purposes.

I claim:

1. A fabricating device comprising, in combination:

a fabricating component including at least two substantially parallel major surfaces and including at least one first perforation having its longitudinal axis disposed substantially transverse to said major surfaces;

said fabricating component including at least one second perforation having its longitudinal axis disposed substantially parallel to said major surfaces;

one of said major surfaces having a projection which surrounds one end of said first perforation;

the other one of said major surfaces having an indentation which surrounds the other end of said first perforation;

the cross section of said projection being substantially similar to the cross section of said indentation; and a connecting component which is adapted to interconnect at least two of said fabricating components by fitting at least partially within said first perforation or said second perforation.

2. A device characterized in accordance with claim 1, wherein said fabricating component includes one or more grooves which are diaposed between said major surfaces and which are shaped similar to the outer periphery of said major surfaces, and said axis of each second perforation being disposed intermediate between and orthogonal to the axis of at least two first perforations.

3. A device characterized in accordance with claim 1, wherein said fabricating component includes a plurality of said first perforations which are spaced apart at uniform intervals and arranged within a straight line.

4. A device characterized in accordance with claim 1, wherein said fabricating component includes a plurality of said first perforations which are spaced apart at uniform intervals and arranged in a first straight line, and includes a plurality of said first perforations which are spaced apart at uniform intervals and are arranged in a second straight line which is parallel to said first straight line.

5. A device characterized in accordance with claim 1, wherein said connecting component includes a base portion and a plurality of projections affixed to said base portion at uniform intervals, and wherein said projections affixed to said base portion are adapted to fit within said second perforations of at least two of said fabricating components.

6. A device characterized in accordance with claim 5, wherein said connecting component has a groove which is disposed along or parallel to the longitudinal axis of said connecting component, and said groove of said connecting component is disposed along the surface of said base portion which is opposed to the surface of said base portion to which said projections are affixed.

7. A device characterized in accordance with claim 1, wherein said connecting component is U-shaped and has legs which are spaced apart by an interval which corresponds to the interval between said second perforation of a first fabricating component and said second perforation of a second fabricating component which is contiguous to said first fabricating component.

8. A device characterized in accordance with claim 1, wherein said connecting component has a tubular shape with an aperture which extends parallel to the entire length of the longitudinal axis of said connecting component, and said connecting component has a discontinuous annular cross section.

9. A device characterized in accordance with claim 8, wherein the external diameter of said tubular shape is larger than the internal diameter of said first or second perforation.

10. A device characterized in accordance with claim 1, wherein said connecting component is made of flexible material and has a rodlike shape with a groove which opens onto the external periphery of said connecting component and which is directed to and formed along the entire longitudinal axis of said connecting component.

PO-1050
(5/69)

UNITED STATES PATENT OFFICE
CERTIFICATE OF CORRECTION

Patent No. 3,603,026 Dated September 7, 1971

Inventor(s) Takaya Kishigami

It is certified that error appears in the above-identified patent and that said Letters Patent are hereby corrected as shown below:

On the title sheet, left column, beneath "[73] Assignee Gakken Co., Ltd.
Tokyo, Japan" insert --[32] Priority March 19, 1969, June 26, 1969
[33] Japan
[31] 44/24621 and 44/60514--.

Signed and sealed this 3rd day of October 1972.

(SEAL)
Attest:

EDWARD M.FLETCHER,JR.
Attesting Officer

ROBERT GOTTSCHALK
Commissioner of Patents